United States Patent [19]

Symons et al.

[11] Patent Number: 4,572,516
[45] Date of Patent: Feb. 25, 1986

[54] LOW FRICTION DYNAMIC SEAL ASSEMBLY WITH CENTRIFUGAL DEFLECTION

[75] Inventors: James D. Symons, Southfield; Ronald J. Dershem, Davisburg; Arnold O. DeHart, Rochester, all of Mich.

[73] Assignee: General Motors Corporation, Detroit, Mich.

[21] Appl. No.: 743,915

[22] Filed: Jun. 12, 1985

[51] Int. Cl.⁴ .............................................. F16J 15/32
[52] U.S. Cl. ...................................... 277/50; 277/25; 277/95; 277/152
[58] Field of Search ...................... 277/25, 95, 65, 82, 277/84, 93 R, 152, 153, 166, 50

[56] References Cited

U.S. PATENT DOCUMENTS

| | | | |
|---|---|---|---|
| 1,931,733 | 10/1933 | Leibing | 277/95 X |
| 2,478,140 | 8/1949 | Ulseth | 277/95 X |
| 3,101,954 | 8/1963 | Huddle | 277/95 X |
| 3,627,390 | 12/1971 | Irwin | 277/25 X |
| 4,311,315 | 1/1982 | Kronenberg | 277/95 |
| 4,497,495 | 2/1985 | Christiansen | 277/27 X |

FOREIGN PATENT DOCUMENTS

| | | | |
|---|---|---|---|
| 308971 | 3/1969 | Sweden | 277/25 |
| 2107024 | 4/1983 | United Kingdom . | |

*Primary Examiner*—Robert S. Ward
*Attorney, Agent, or Firm*—Patrick M. Griffin

[57] ABSTRACT

A low friction dynamic seal assembly in which a seal body is selectively bonded to certain portions of a seal case fixable to a rotatable member. The selected bonding creates a hinge with the seal case of controllable resistance to the initial deflection of the seal body caused when the seal case is fixed rotatable member. The seal body is selectively bonded substantially only to that portion of the seal case toward which the seal body is deflected. Therefore, reduced frictional loads are provided at low speed of rotation. Additionally, the hinge provided by the selected bonding allows further deflection of the seal body at higher speeds of rotation to further reduce seal friction.

3 Claims, 5 Drawing Figures

LOW FRICTION DYNAMIC SEAL ASSEMBLY WITH CENTRIFUGAL DEFLECTION

This invention relates to seals generally and specifically to a low friction dynamic seal assembly.

BACKGROUND OF THE INVENTION

The design of a seal, especially a dynamic seal with a rotating flexible seal body, involves several compromises. Such seal generally is located within a limited space between two relatively rotatable members, such as bearing races. This limits the possible size of the sealing body, especially the length thereof. Such a sealing body must have a certain thickness sufficient for the speeds involved to give it an inherent circumferential stability. Circumferential stability keeps the seal from rippling at high speed and keeps the seal in good sealing contact with a sealing surface. Since it is impractical to mold such a seal body directly to the rotating member, it is most conveniently molded to a separable casing which can be press fitted to one of the members. The press fit forces a lip of the seal body into secure sealing engagement with the sealing surface and deflects the seal body a certain amount. This deflection is resisted by the seal body in proportion to its thickness, which thickness is controlled by the other consideration discussed above. Therefore, the deflection necessary to give secure sealing engagement of the lip may in fact cause a higher frictional load of the lip on the sealing surface that would be ideally desirable.

In addition, the frictional load will increase at higher speeds of rotation. This problem is especially severe with seals of large diameter, required in applications where the seal is fitted over a member of large diameter, such as a large diameter constant velocity joint housing. An example of a seal in such an application may be seen in UK Pat. application No. GB 2,107,024-A.

The seal disclosed in the U.S. Pat. to Irwin No. 3,627,390 seeks to achieve adequate stationary sealing combined with reduced friction at high speeds by using the centrifugal force of rotation to lift the lip from its sealing surface. However, as may be seen FIG. 2 of the patent, this action is achieved by molding steel weights into the lip of the sealing body in order to get sufficient centrifugal force to move the lip away. Clearly, it would be desirable to eliminate these weights if possible, if this could be achieved within the limitations on seal body thickness and length discussed above.

SUMMARY OF THE INVENTION

The invention provides a low friction dynamic seal assembly with reduced frictional loads within the limitations discussed above.

The seal assembly of the invention seals between a pair of members, such as bearing races, one of which is rotatable about an axis. A sheet metal seal case is fixable to the rotatable member. The seal case has a generally L-shaped cross section having a surface with a cylindrical portion coaxial to the axis of the races and an integral radial portion generally normal thereto. The surface of the seal case will have a flexible seal body bonded thereto.

A sealing surface on the other race is spaced from the seal case surface and defines therewith a seal space that limits the length of the flexible seal body. In the embodiment disclosed, the sealing surface is provided on another sheet metal member of generally L-shaped cross section that is fixable to the other race.

The flexible seal body bonded to the seal case surface is molded of elastomer and has a generally frustoconical shape. The seal body has a length extending from the seal case surface to a lip that is engagable with the sealing surface. The seal body thickness is sufficient to give it inherent circumferential stability for the desired speeds of rotation. When the seal case is fixed to the rotatable race, the seal body is deflected by the engagement of its lip with the sealing surface. The deflection moves the seal body an initial amount toward one of the seal case surface portions and away from the other. The seal body is selectively bonded to the seal case so as to reduce seal friction within these length and thickness constraints.

The seal body is bonded to substantially just that portion of the seal case surface toward which the seal body is deflected, and is free to flex away from the other portion. This creates a hinge with the seal case surface by which the resistance to that deflection is controlled. In the embodiment disclosed, the seal body is molded so as to adhere to the radial portion of the seal case surface, because it is that portion toward which the seal body is deflected. The seal body adheres to none or to only a selected part of the cylindrical portion of the seal case surface. Varying the amount of bonding to the cylindrical surface portion allows hinges of varying resistance to the initial deflection to be molded from a single mold, if desired.

During rotation of the rotatable member at low speeds, the frictional load of the lip of the seal body on the sealing surface caused by the initial deflection is reduced because of the selective bonding described above. In addition, at higher speeds of rotation, the hinge created by the selective bonding allows the seal body to deflect an additional amount under the centrifugal force of rotation. This controlled lift-off serves to further reduce seal friction at the higher speed of rotation, while the thickness of the seal body still gives inherent circumferential stability.

It is, therefore, a broad object of the invention to provide a low friction dynamic seal assembly selectively bonded for sealing between a pair of members, one of which is rotatable about an axis.

It is another object of the invention to provide such a low friction seal assembly by selectively bonding a flexible seal body to substantially only that portion, of a pair of generally perpendicular seal case seal surface portions, toward which the seal body is initially deflected upon engaging a seal surface when the seal case is fixed to the rotatable member, a selective bonding which creates a hinge with controllable resistance to the initial deflection, thereby reducing the frictional load caused by the initial deflection and reducing the seal friction at low speeds, while also allowing the seal body to deflect an additional amount under the centrifugal force of rotation at higher speeds to further reduce seal friction.

It is a further object of the invention to provide a low friction seal assembly of the type described in which the selectively bonding is done by molding the seal body so as to adhere substantially to only that portion of the seal case surface toward which it is initially deflected, and so as to adhere to only a selected part of the other seal case surface portion away from which it is initially deflected, thereby also allowing a seal body having varying amounts of resistance to deflection to be molded with a single pair of mold elements by varying the size of the selected part of the other seal case surface portion to which the seal body is adhered.

DESCRIPTION OF THE PREFERRED EMBODIMENT

These and other objects and features of the invention will appear from the following written description and drawings in which, FIG. 1 is a sectional view of a portion of a pair of rotatable members as the seal assembly of the invention is being inserted into place with the seal body thereof in its free molded position;

Figure 1:
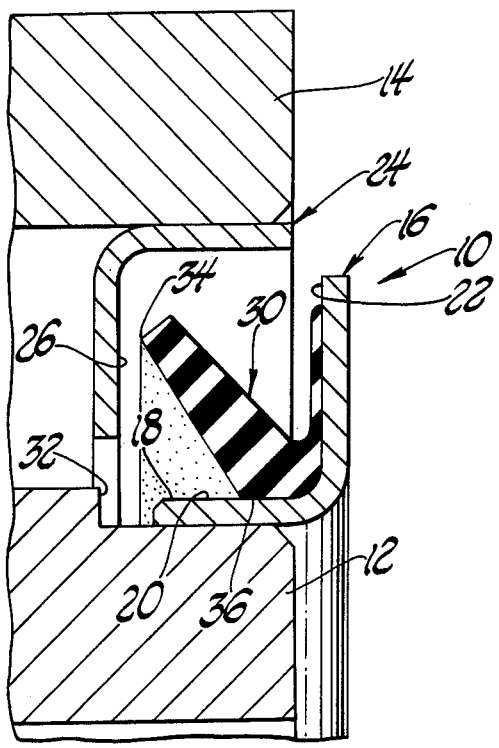

Referring first to FIG. 1, the seal assembly of the invention, designated generally at 10, provides a seal between a pair of members, being an inner race 12 and an outer race 14. Inner race 12 rotates about an axis, and may in turn be fitted to some other structure, such as the outside of a constant velocity joint housing, not shown.

Seal assembly 10 includes a seal case, designated generally at 16, which is a steel stamping of generally L-shaped cross section. The inner surface of seal case 16, designated generally at 18, includes a cylindrical portion 20 and a radial portion 22 integral therewith and generally normal thereto. Other seal cases 16 may be stamped with a shape more complex than the L-shaped cross section shown. Any seal case shape will generally have substantially cylindrical portions coaxial to the races 12 and 14 and radial portions generally normal thereto, these being the two basic orientations possible between the race members 12 and 14.

Figure 4:
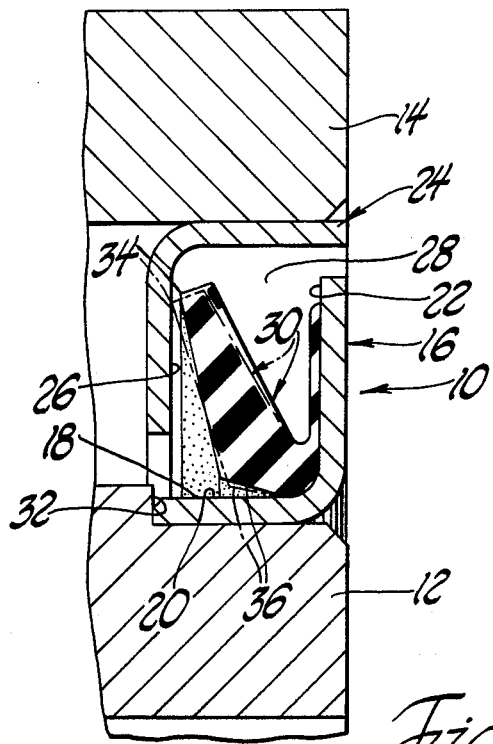
FIG. 4 is a view similar to FIG. 3 showing the further deflection of the seal body of the seal assembly of the invention while operating at higher speeds of rotation (solid line) from its operating position while stationary or at low speeds of rotation (dotted line)

Still referring to FIG. 1, a sealing surface member, designated generally at 24, is also a metal stamping of generally L-shaped cross section. Sealing surface member 24 is shown fixed to outer race 14 by a press fit. Using a separate member 24 is a practical way of providing a sealing surface 26, although it could also be integral with or ground into race member 14. Seal case 16 is also fixable to inner race 12 by a press fit, and is shown in the process of being so press fitted in FIG. 1. When seal case 16 is fixed to inner race 12, as seen in FIG. 4, sealing surface 26 will be spaced from seal case surface 18 to define a sealing space 28 therewith. The spacing of seal case surface 18 and sealing surface 26 may be controlled by the abutment of seal case 16 with a shoulder 32 on the inner race 12. It will be understood that seal space 28 will limit the available size, and especially the length, of any flexible seal body to be bonded to seal case 16. The flexible seal body is designated generally at 30 and described more fully below.

Figure 3:
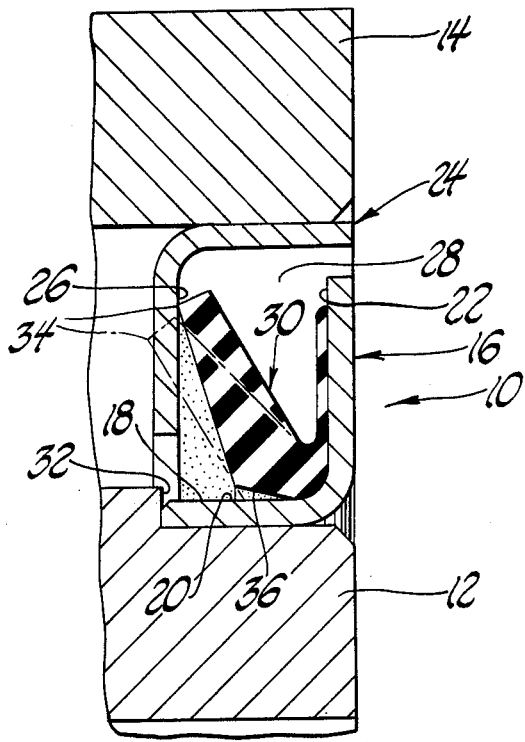
FIG. 3 is a view similar to FIG. 1 showing the seal assembly of the invention with the seal body deflected from its free molded position (dotted line) to its fixed in place operating position while stationary or at low speeds of rotation (solid line)

Referring back to FIG. 1, the seal body 30 is molded of a suitable flexible elastomer and has a generally frustoconical shape. Seal body 30 has a thickness sufficient to give it inherent circumferential stability during rotation at the speeds desired. This thickness will, of course, vary for different elastomers of varying elasticities and for different speeds. However, this thickness is calculable by known means and is a limitation within which the seal designer must work. Seal body 30 extends in the free molded state of FIG. 1 from seal case surface 18 toward sealing surface 26 to a lip 34. Lip 34 is engagable with sealing surface 26 as seal case 16 is press fitted onto inner race 12. As may be seen in FIG. 3, this engagement of lip 34 with sealing surface 26 deflects seal body 30 an initial amount from its free molded position, shown by dotted lines. This initial deflection is toward the radial portion 22 of seal case surface 18 and away from the cylindrical portion 20, to the solid line position. The resistance of seal body 30 to the initial deflection provides a frictional load of lip 34 on sealing surface 26. The amount of the deflection resistance, and therefore the amount of the frictional load, is controlled by the invention, as will be next described.

Figure 2:
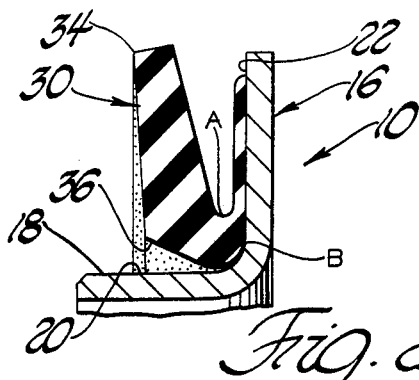
FIG. 2 is a sectional view of that portion of the seal assembly removed from the rotatable members and with the seal body deflected from its free molded position.

Referring to FIG. 2, seal case 16 is shown separate and removed from inner race 12. Seal body 30 is shown deflected an exaggerated amount from that shown in FIG. 3 in order to illustrate its selective bonding to seal case surface 18. Seal body 30 is molded so as to adhere substantially to only the radial portion 22 of seal case surface 18. No bonding agent is used on the cylindrical portion 20 of seal case surface 18, thereby leaving a base 36 of seal body 30 free from seal case surface 18. This selective bonding creates a live hinge with seal case surface 18. The resistance of the hinge to the deflection of seal body 30 will be determined by, and controllable by, the thickness measured from point A to point B, as shown in FIG. 2. It will be understood that the resistance to deflection will not be determined just by the thickness of seal body 30, as would be the case were the entire base 36 conventionally bonded to adhere to seal case surface 18.

Figure 5:
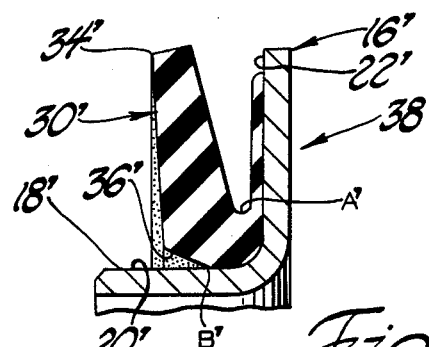
FIG. 5 is a view similar to FIG. 2 showing another embodiment of the invention.

Furthermore, by the selective application of bonding agent, seal bodies with varying resistance to deflection may be molded with the same mold. Another embodiment of the invention, 38, may be seen in FIG. 5. Like structure is given the same number with a prime. Rather than keeping seal base 36' completely free from cylindrical portion 20', a selected part of cylindrical portion 20' may have bonding agent applied. Thus, a thicker hinge will be created, measured from A' to B'. The thickness may be varied depending on how large a selected part of cylindrical portion 20' is treated with bonding agent. The shape of seal body 30' is the same as seal body 30, and it may therefore be molded by the same pair of mold elements.

Referring again to FIG. 3, it will be understood that, due to the selective bonding described above, the frictional load of lip 34 on sealing surface 26 will be reduced. Therefore, at low speeds of rotation of inner race 12, where lip 34 remains in the FIG. 3 position, seal friction will be reduced. As seen in FIG. 4, at higher speeds of rotation, seal body 30 will further deflect from its FIG. 3 position, shown in dotted lines, under centrifugal force. The amount of this additional deflection is also controlled by the selective bonding described above, and will be greater for hinges of less thickness. The further deflection and reduction in loading of lip 34 from sealing surface 26 serves to further reduce seal friction at the higher speeds of rotation. The deflection is exaggerated in FIG. 4 for illustration, but it will be understood that the reduction in loading may be had without breaking sealing contact. The selective bonding of the invention allow the seal body 30 to behave centrifugally as would a longer seal body, one that would not fit within the limited space available. As an additional advantage, rotating seal case 16 acts as a slinger to throw contaminants away from sealing space 28.

It will be understood that other orientations of seal body 30 and seal surface 26 are possible. For example, sealing surface 26 could be cylindrical, and coaxial with the axis of race members 12 and 14. In that case, seal body 30 would be initially deflected radially away from a cylindrical seal surface, rather than axially away from a radial seal surface, as in the embodiment illustrated. Then, the selective bonding would be reversed relative to the radial and cylindrical portions of the seal case surface. In both cases, reduced friction at low speeds would result from the selective bonding, and reduced friction at higher speeds of rotation would result from the centrifugal force of rotation and the further deflection about the hinge. In either case, a seal body with the necessary thickness would operate with a frictional load lower than that which would result from conventional bonding. Therefore, it will be understood that the invention may be embodied in structures other than that disclosed, and is not intended to be so limited.

We claim:

1. A low friction dynamic seal assembly for sealing between a pair of members, one of which is rotatable about an axis, a seal case fixable to said rotatable member and having a surface with a substantially cylindrical portion coaxial to said members and a radial portion generally normal thereto, a sealing surface on the other member spaced from said seal case surface to define a seal space limiting the length of a seal body to be bonded to said seal case surface, and a flexible seal body having a thickness sufficient to give inherent circumferential stability thereto during rotation and having a length extending from said seal case surface to a lip engagable with said sealing surface, said lip engaging said sealing surface to provide a frictional load thereon when said seal case is fixed to said rotatable member to deflect said seal body an initial amount toward one of said seal case surface portions and away from the other, said seal body being selectively bonded substantially only to said one seal case surface portion to create a hinge therewith of controllable resistance to said initial deflection of said seal body, whereby the frictional load of said lip on said sealing surface caused by said initial deflection is reduced due to said selective bonding at low speeds of rotation, and whereby said seal body may be further deflected about said hinge under the centrifugal force of rotation an additional amount, thereby further reducing seal friction at higher speeds of rotation, also due to said selective bonding.

2. A low friction dynamic seal assembly for sealing between a pair of members, one of which is rotatable about an axis, a seal case fixable to said rotatable member and having a surface with a substantially cylindrical portion coaxial to said members and a radial portion generally normal thereto, a sealing surface on the other member spaced from said seal case surface to define a seal space limiting the length of a seal body to be bonded to said seal case surface, and a flexible seal body having a thickness sufficient to give inherent circumferential stability thereto during rotation and having a length extending from said seal case surface to a lip engagable with said sealing surface, said lip engaging said sealing surface to provide a frictional load thereon when said seal case is fixed to said rotatable member to deflect said seal body an initial amount toward said radial seal case surface portion and away from said cylindrical seal case surface portion, said seal body being selectively bonded substantially only to said radial seal case surface portion to create a hinge therewith of controllable resistance to said initial deflection of said seal body, whereby the frictional load of said lip on said sealing surface caused by said initial deflection is reduced due to said selective bonding at low speeds of rotation, and whereby said seal body may be further deflected about said hinge under the centrifugal force of rotation an additional amount, thereby further reducing seal friction at higher speeds of rotation, also due to said selective bonding.

3. A low friction dynamic seal assembly for sealing between a pair of members, one of which is rotatable about an axis, a seal case fixable to said rotatable member and having a surface with a substantially cylindrical portion coaxial to said members and a radial portion generally normal thereto, a sealing surface on the other member spaced from said seal case surface to define a seal space limiting the length of a seal body to be bonded to said seal case surface, and a moldable flexible seal body having a thickness sufficient to give inherent circumferential stability thereto during rotation and having a length extending from said seal case surface to a lip engagable with said sealing surface, said lip engaging said sealing surface to provide a frictional load thereon when said seal case is fixed to said rotatable member to deflect said seal body an initial amount toward one of said seal case surface portions and away from the other, said moldable seal body being selectively bonded when molded so as to adhere to said one seal case surface portion and to only a selected part of the other seal case surface portion, to create a hinge with said seal case surface of controllable resistance to said initial deflection of said seal body, whereby the frictional load of said lip on said sealing surface caused by said initial deflection is reduced due to said selective bonding at low speeds of rotation, and whereby said seal body may be further deflected about said hinge under the centrifugal force of rotation an additional amount, thereby further reducing seal friction at higher speeds of rotation, also due to said selective bonding, said selective bonding also allowing seal bodies of varying resistance to deflection to be molded with a single mold by varying the size of said selected part of said other seal case surface portion to which said moldable seal body is adhered.

* * * * *